No. 826,186. PATENTED JULY 17, 1906.
J. L. McSPADDEN, H. L. WILKIE & W. H. LEWIS.
NUT LOCK.
APPLICATION FILED SEPT. 14, 1905.
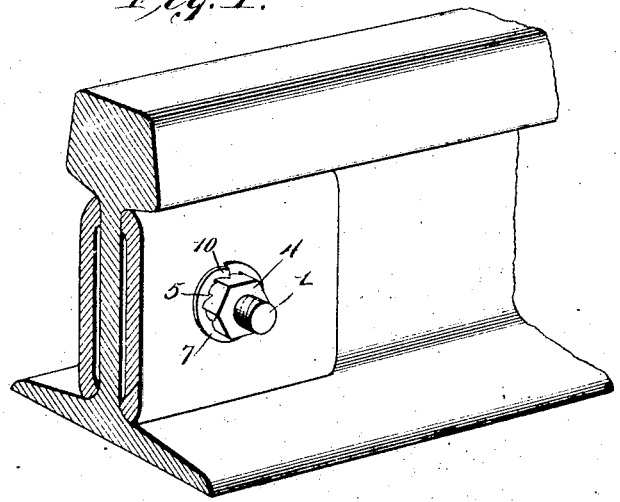
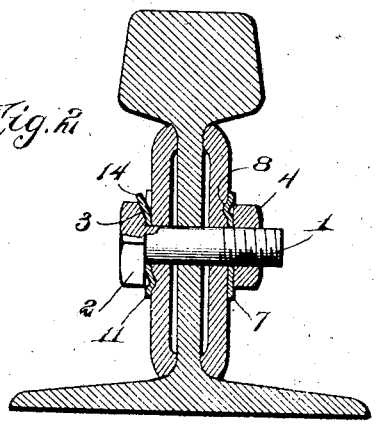
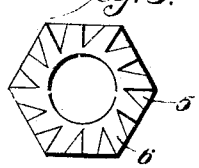
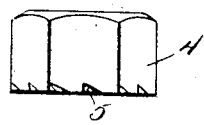
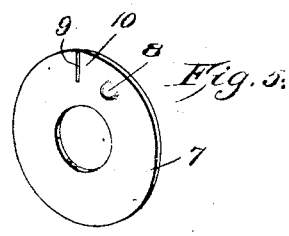
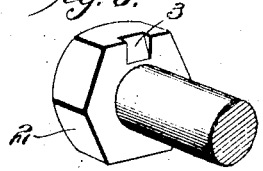
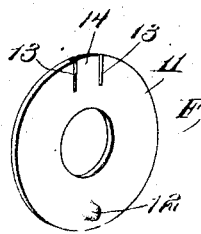
Witnesses:
Louis R. Heinrichs
Herbert D. Lawson
Inventors
J. L. McSpadden
H. L. Wilkie
W. H. Lewis
By W. T. FitzGerald & Co.
Attorneys

UNITED STATES PATENT OFFICE.

JOHN L. McSPADDEN, HENRY L. WILKIE, AND WILLIAM H. LEWIS, OF DETOUR, MICHIGAN.

NUT-LOCK.

No. 826,186. Specification of Letters Patent. Patented July 17, 1906.

Application filed September 14, 1905. Serial No. 278,423.

*To all whom it may concern:*

Be it known that we, JOHN L. McSPADDEN, HENRY L. WILKIE, and WILLIAM H. LEWIS, citizens of the United States, residing at Detour, in the county of Chippewa and State of Michigan, have invented certain new and useful Improvements in Nut-Locks; and we do hereby declare the following to be a full, clear, and exact description of the invention, such as will enable others skilled in the art to which it appertains to make and use the same.

Our invention relates to nut-locks; and its object is to provide a device of this character having means whereby either or both the head and nut of the bolt can be locked against rotation, thereby rendering the lock particularly adapted for use upon fish-plates.

The invention consists of a nut having a series of teeth formed upon its inner face adapted to engage a lip which is struck from a spring-washer inserted between the nut and the surface against which it is to be screwed. This washer also has means for engaging said surface so that it will not rotate with the nut. Another washer is interposed between the head of the bolt and the surface adjacent thereto, and this washer also has a tongue or lip for projecting into a recess within the head.

The invention also consists of certain other novel features of construction and combination of parts which will be hereinafter more fully described, and pointed out in the claim.

In the accompanying drawings we have shown the preferred form of our invention.

In said drawings, Figure 1 is a perspective view of a portion of a rail and fish-plates thereon, said plates being held by a bolt provided with our improved lock. Fig. 2 is a section through the rail and fish-plates, showing the bolt in position therein. Fig. 3 is an elevation of the inner face of the nut. Fig. 4 is an edge view of the nut. Fig. 5 is a perspective view of the washer used in connection with the nut. Fig. 6 is a perspective view of the head of the bolt, and Fig. 7 is a similar view of the washer adapted to engage said head.

Referring to the figures by numerals of reference, 1 is a bolt having a head 2, in the inner face of which is formed a recess 3. A nut 4 is mounted on the bolt and has angular recesses 5 in its inner face which form ratchet-teeth 6. In using the bolt and nut herein described we employ washers such as shown in Figs. 5 and 7. The washer 7, which is shown in Fig. 6, is ring-like in form and has a lug 8, struck or otherwise formed upon one face thereof, and a slit 9 is cut into the washer from its periphery, so as to form a spring-lip 10, which projects at a slight angle from the body of the washer. The washer 11 (shown in Fig. 7) is also provided with a lug 12, which is similar to the lug 8; but this washer has two slits 13 cut thereinto from its periphery, said slits being parallel and clamping a tongue or lip 14 of a width equal to the width of recess 3 in the bolt-head.

When it is desired to lock the bolt and nut to an object, the bolt is first placed within the washer 11 and the tongue or lip 14 is pressed backward at an angle so as so rest within the recess 3. The lug 13 is then forced into the surface of the object engaged by the bolt, as shown in Fig. 2. Washer 7 is then placed on the bolt at the other side of the object and lug 8 is forced into engagement with the object. The nut is then screwed upon the bolt and its ratchet-teeth 6 will slip over the lip 10. A reverse movement of the nut is, however, prevented by said lip. By this arrangement it will be noticed that the bolt, as well as the nut, is held against rotation, and therefore a secure lock is provided, and it is impossible for the bolt to become accidentally detached. While we preferably employ the two washers herein described upon one bolt, we can, if desired, use either of them only.

It will be noticed that the recesses 5 do not extend to the bolt-hole within the nut, but instead a continuous unbroken portion surrounds said bolt-hole between it and the recesses, and this smooth portion constitutes an abutment for the nut when it is screwed against any object, and the teeth 6 will not, therefore, cut into and injure said object. Moreover, by providing this arrangement of recesses it is unnecessary to cut the slit 9 from the periphery of the washer 7 into the bolt-hole, but instead said slit need only be of a length equal to the distance between the ends of the recesses 5.

Having thus fully described our invention, what we claim as new, and desire to secure by Letters Patent, is—

The combination with a bolt having a head and a beveled portion forming a recess in one face of the head said recess starting near the bolt-body and flush with the face of said head and gradually deepening to its upper end; of a washer upon the bolt, a lug struck therefrom and adapted to engage an object
5 containing the bolt, and an inclined lip extending from the washer and into the recess in the head, said lip formed by parallel slits extending into the washer from its periphery.

In testimony whereof we have signed our names to this specification in the presence of two subscribing witnesses.

JOHN L. McSPADDEN.
HENRY L. WILKIE.
WILLIAM H. LEWIS.

Witnesses:
CHARLES McLEAN,
OTIS WILKIE.